United States Patent [19]

Allibert

[11] 4,231,392
[45] Nov. 4, 1980

[54] COLOR-CHANGING VALVE FOR AN AUTOMATIC PAINTING MACHINE

[75] Inventor: Jean-Pierre Allibert, Chatenay Malabry, France

[73] Assignee: Regie Nationale des Usines Renault, Boulogne Billancourt, France

[21] Appl. No.: 935,374

[22] Filed: Aug. 21, 1978

[30] Foreign Application Priority Data

Aug. 22, 1977 [FR] France .................. 77 25556

[51] Int. Cl.$^3$ .............................................. F16K 19/00
[52] U.S. Cl. .................. 137/454.2; 137/606; 239/305
[58] Field of Search .................. 137/454.2, 454.5, 606, 137/869, 883, 884; 239/304, 305, 306, 307, 308, 412, DIG. 14; 222/132, 144.5

[56] References Cited

U.S. PATENT DOCUMENTS

| | | | |
|---|---|---|---|
| 1,154,868 | 9/1915 | McHenry | 137/606 X |
| 2,598,961 | 6/1952 | Andrus | 137/883 |
| 3,009,653 | 11/1961 | Hedeman | 222/144.5 X |
| 3,135,467 | 6/1964 | Greenman | 239/304 |
| 3,322,350 | 5/1967 | Heinicke | 239/304 X |
| 3,373,762 | 3/1968 | Korchak | 137/606 X |
| 3,572,366 | 3/1971 | Wiggins | 137/606 X |
| 3,670,768 | 6/1972 | Griswold | 137/606 |
| 3,870,233 | 3/1975 | Wilhelm | 239/305 X |
| 3,872,888 | 3/1975 | Porter | 137/883 |
| 4,163,523 | 8/1979 | Vincent | 239/305 |

*Primary Examiner*—Robert G. Nilson
*Attorney, Agent, or Firm*—Fleit & Jacobson

[57] ABSTRACT

The color-changing valve is constituted by a predetermined number of unitary valves, one unitary valve being provided for each color. The unitary valves are mounted on a common manifold by simple engagement and maintained in position on the manifold by screwing means. The valve system is primarily designed for paint-spraying applications in automobile production plants.

2 Claims, 7 Drawing Figures

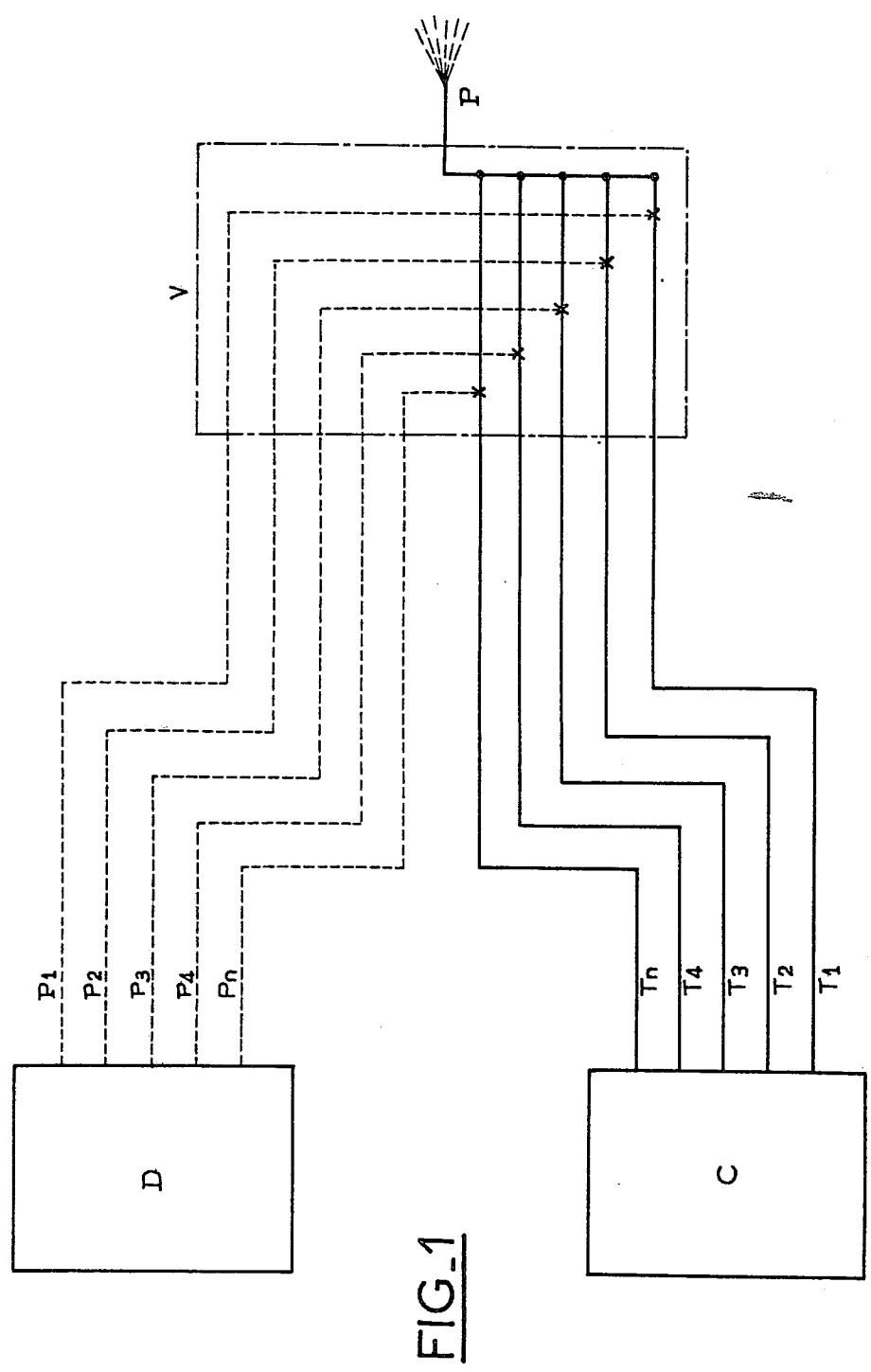
FIG_1

FIG.4
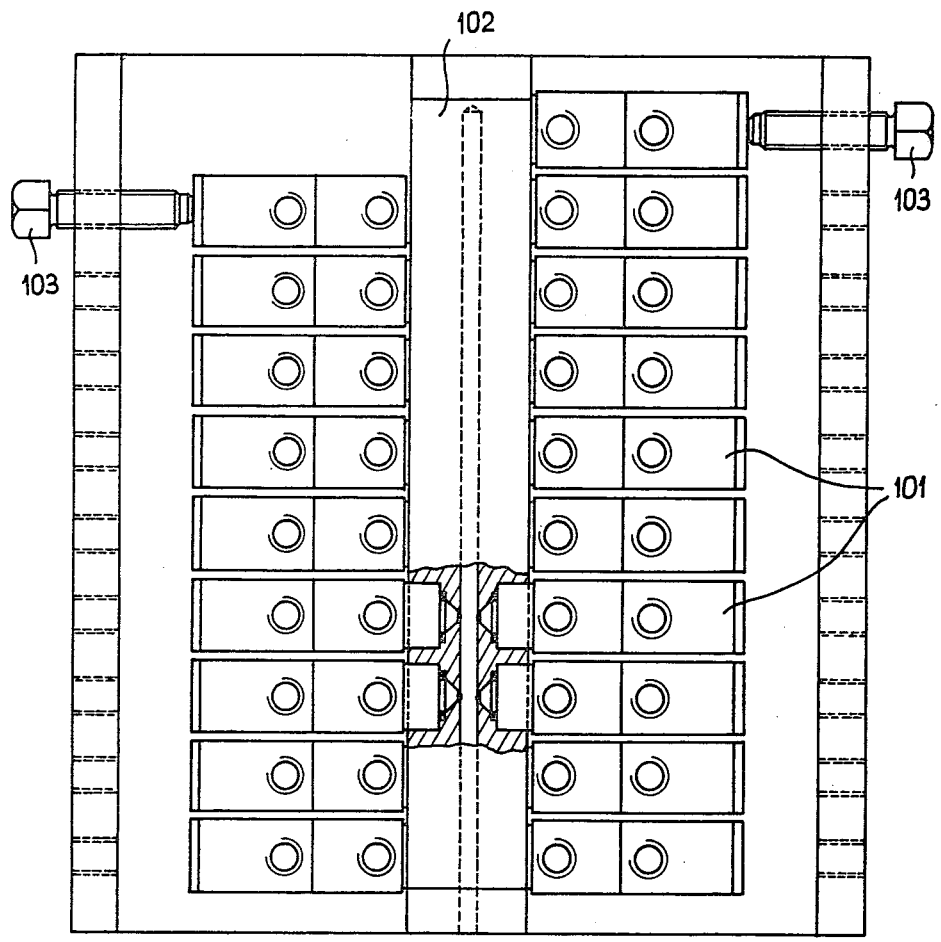
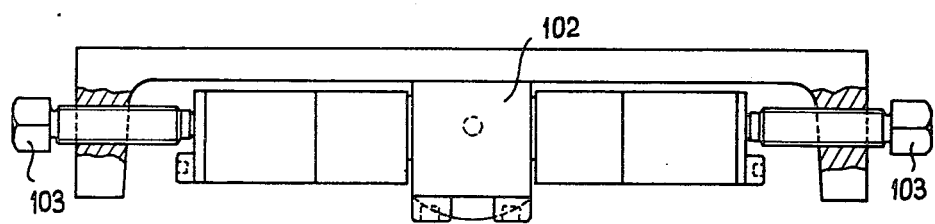
FIG.5

COLOR-CHANGING VALVE FOR AN AUTOMATIC PAINTING MACHINE

This invention is in the field of automatic painting machines. It is more specifically directed to a modular color-changing valve for automatic painting machines, especially those which are installed in paint-spraying bays or booths of the type employed for the application of cellulose lacquers in automobile production plants.

In spraying booths of this type, it was possible to employ assemblies comprising a number of machines each equipped with a color-changing valve comprising a color-selecting rotor adapted to cooperate with a number of micro-jacks corresponding to the number of paint-admission valve inlets. A color control system of this type comprised a large number of elements (motor, stops, micro-jacks, couplings and the like) which impaired the reliability of the assembly as a whole. Different problems of leak-tightness between the stator and rotor inlets also arose. Furthermore, it proved impossible to carry out repair work or servicing on defective components during a production-line painting operation. Indeed any kind of remedial action necessarily entailed the need for systematic removal of the valve and replacement of this latter outside working hours. Any reconditioning operation such as replacement of all the seals, re-grinding of bearing surfaces or any repairs of a similar nature could be carried out only in the workshop.

The aim of the present invention is to provide a color-changing valve which can advantageously replace the valves of the prior art while circumventing the disadvantages attached to these latter as described in the foregoing.

The color-changing valve in accordance with the invention is essentially constituted by a predetermined number of unitary valves, provision being made for one valve for each color. Said valves are mounted on a common manifold by simple engagement and maintained in position on said manifold by screwing means.

Each unitary valve is provided with a spring-loaded closure pintle operated by compressed air.

A more complete understanding of the invention will be gained from the following description of one embodiment of a color-changing valve which is given by way of example and not in any sense by way of limitation, reference being made to the accompanying drawings, wherein:

FIG. 1 is a diagrammatic illustration of an automatic painting machine;

FIG. 4 is a fragmentary plan view of the color-changing valve in accordance with the invention;

FIG. 5 is a fragmentary end view of the valve shown in FIG. 4;

There is shown diagrammatically in FIG. 1 an automatic painting machine on which is mounted upstream of the paint spray gun P a color-changing valve V to which a number of feed pipes $T_1$, $T_2$, $T_3$, $T_4$ ... $T_n$ extend from a paint distribution center, each color being determined by means of a pneumatic signal $p_1$, $p_2$, $p_3$, $p_4$ ... $p_n$ derived from a device for determining the color and controlling the valve V.

Figure 3:
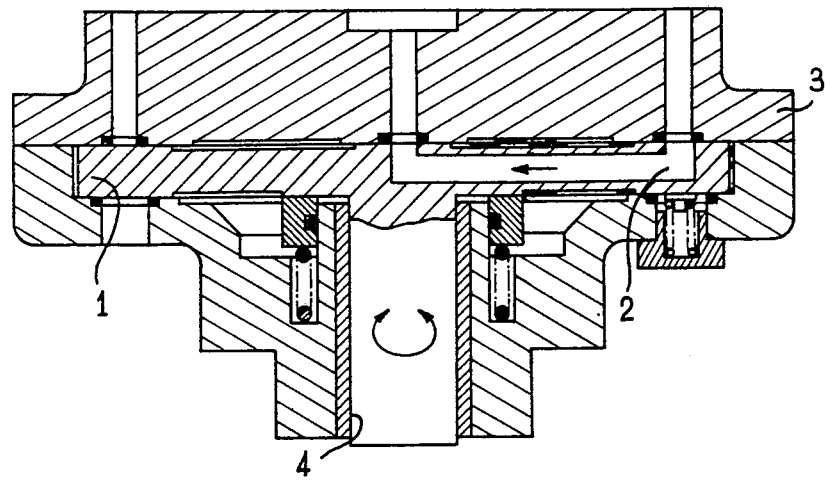
FIG. 3 is a transverse sectional view taken along line A—A of FIG. 2.
Figure 2:
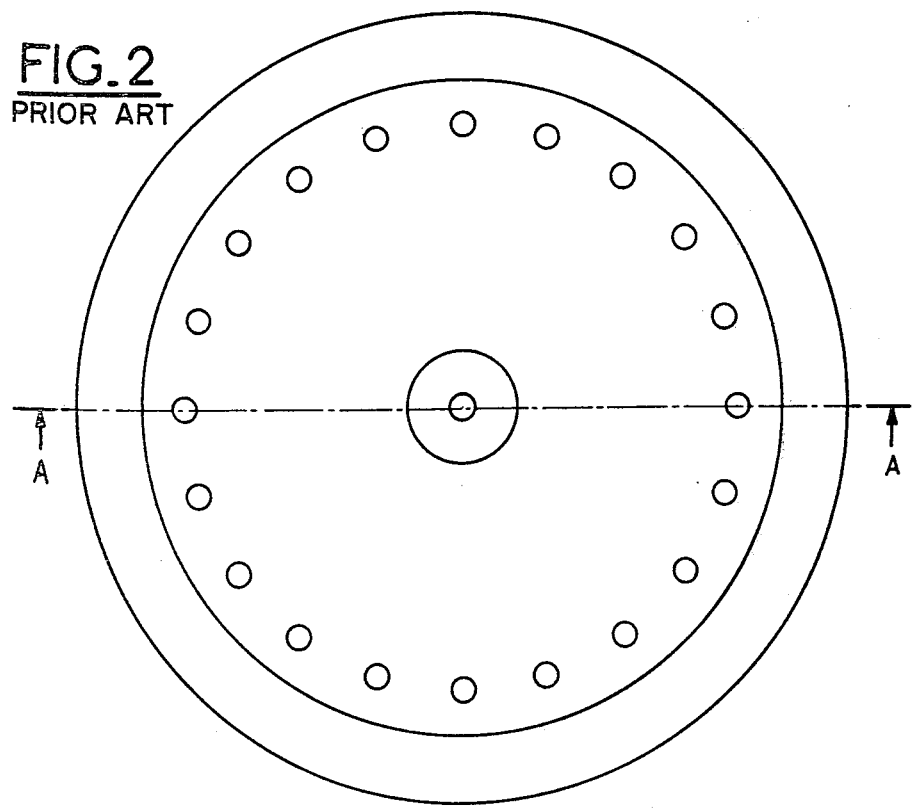
FIG. 2 is a plan view of a color-changing valve of the prior art.
Figure 6:
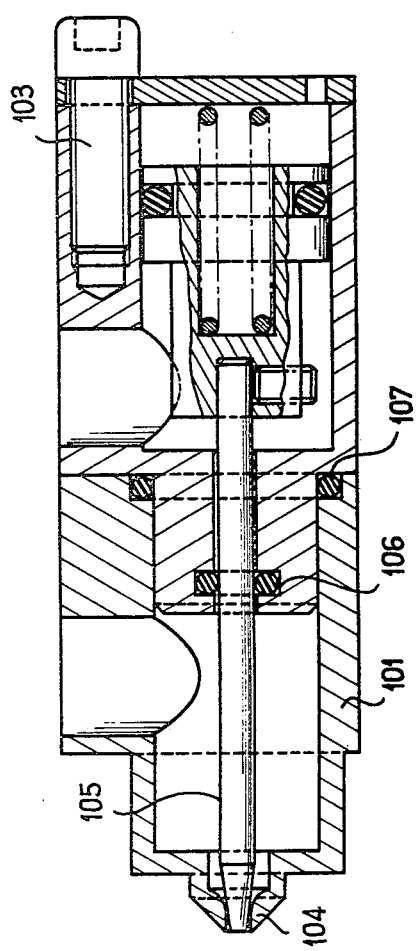
FIG. 6 is a longitudinal axial sectional view of a unitary valve constituting the valve in accordance with the invention.
Figure 7:
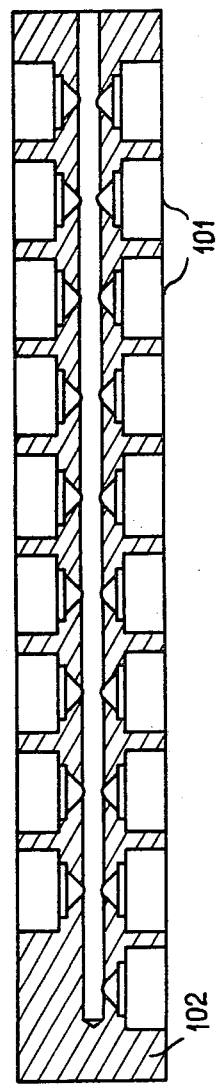
FIG. 7 is a longitudinal axial sectional view of the valve manifold in accordance with the invention.

In the known form of construction of a color-changing valve as shown in FIGS. 2 and 3, color selection is obtained by displacement of the rotor 1 so as to bring the outer end 2 of its duct opposite to the inlet for the admission of paint of the desired color to the stator 3. The choice of color is transmitted in the form of air pressure to a micro-jack and this latter actuates a stop for arresting the movement of a lug which is rigidly fixed to the rotor shaft (the number of micro-jacks therefore corresponds to the number of paint admission inlets in the valve). The shaft 4 of the rotor 1 is driven by a reversible pneumatic motor.

In the design of a color-changing valve in accordance with the invention, provision is made for a common manifold 102 on which are engaged a predetermined number of unitary valves 101 each assigned to a different color and each maintained under pressure on the manifold by means of a screw 103. The system of engagement is adapted to facilitate rinsing of the manifold for each color change.

Each unitary valve 101 operates in accordance with the known principle of a piston operated by compressed air and restored by a spring which actuates the pintle 105, the function of which is to close the outlet through which paint is discharged from the spray nozzle 104 of each unitary valve 101.

This simple control system does not reduce the reliability of the assembly to any extent whatsoever and a maximum degree of simplicity has been obtained in the design of each unitary valve which is constituted by a total of ten elements including bolts as well as two O-ring seals 106, 107 and a packing gland, thus achieving tightness against paint leakage by the means aforesaid (static O-ring seals, packing gland, valve pintle) which are insensitive to pressure variations or pressure unbalance.

It is also possible to replace unitary valves during production (this operation takes about 10 minutes) without calling for the installation of a complete valve assembly but only of a few spare elements. Moreover, the time required to rinse-out the valve in accordance with the invention is equal at a maximum to the time required for a valve of the prior art.

It is readily apparent that the invention is not limited to the embodiment described in the foregoing with reference to the accompanying drawings but extends on the contrary to all modifications and alternative forms of construction within the capacity of anyone versed in the art and derived from the same basic principle.

I claim:

1. A modular color-changing valve for automatic painting machine comprising:
    a longitudinally-extending common manifold having a plurality of tapered bores communicating therewith;
    means for supporting said common manifold, said supporting means having support surfaces extending parallel to and spaced from said common manifold, each of said support surfaces having a plurality of threaded bores formed therein, the axes of the threaded bores being parallel with the axes of the tapered bores of said common manifold;
    a plurality of unitary valves interposed between said support surfaces and said common manifold, each of said valves having a tapered nozzle received in a tapered bore of said common manifold; and a plurality of screws threadedly engaged with threaded bores of said support surfaces, ends of said screws contacting portions of said unitary valves to urge said tapered nozzles of said unitary valves into sealing engagement with said tapered bores of said common manifold.

2. A valve according to claim 1, wherein each unitary valve is provided with a spring-loaded closure pintle operated by compressed air.

* * * * *